US008825509B2

(12) United States Patent (10) Patent No.: US 8,825,509 B2
Yerkes et al. (45) Date of Patent: Sep. 2, 2014

(54) SYSTEM, METHOD AND COMPUTER PROGRAM PRODUCT FOR LEVERAGING A CUSTOMER RELATIONSHIP MANAGEMENT SYSTEM TO SEND MEETING INVITATIONS

(75) Inventors: Ron Yerkes, San Ramon, CA (US); Yurika Sebata-Dempster, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 471 days.

(21) Appl. No.: 12/910,748

(22) Filed: Oct. 22, 2010

(65) Prior Publication Data

US 2011/0099042 A1 Apr. 28, 2011

Related U.S. Application Data

(60) Provisional application No. 61/254,534, filed on Oct. 23, 2009.

(51) Int. Cl.
*G06Q 10/00* (2012.01)

(52) U.S. Cl.
USPC ........................................ 705/7.19; 705/7.18

(58) Field of Classification Search
USPC .............................................. 705/7.11–7.42
See application file for complete search history.

(56) References Cited

U.S. PATENT DOCUMENTS

| 7,209,929 | B2 | 4/2007 | Dominguez, Jr. et al. | |
|---|---|---|---|---|
| 7,698,160 | B2 | 4/2010 | Beaven et al. | |
| 7,869,583 | B2 * | 1/2011 | Mandalia et al. | 379/201.01 |
| 8,019,632 | B2 * | 9/2011 | Niheu et al. | 705/7.11 |
| 8,082,301 | B2 | 12/2011 | Ahlgren et al. | |
| 8,095,413 | B1 | 1/2012 | Beaven | |
| 8,095,594 | B2 | 1/2012 | Beaven et al. | |
| 8,200,520 | B2 * | 6/2012 | Chen et al. | 705/7.19 |
| 8,275,836 | B2 | 9/2012 | Beaven et al. | |
| 2003/0233404 | A1 | 12/2003 | Hopkins | |
| 2005/0065925 | A1 | 3/2005 | Weissman et al. | |
| 2005/0223022 | A1 | 10/2005 | Weissman et al. | |
| 2005/0283478 | A1 | 12/2005 | Choi et al. | |
| 2006/0067250 | A1 * | 3/2006 | Boyer et al. | 370/260 |
| 2006/0206834 | A1 | 9/2006 | Fisher et al. | |
| 2007/0100845 | A1 * | 5/2007 | Sattler et al. | 707/100 |
| 2007/0203820 | A1 | 8/2007 | Rashid | |
| 2007/0250784 | A1 | 10/2007 | Riley et al. | |
| 2008/0028021 | A1 * | 1/2008 | Roberts et al. | 709/203 |
| 2008/0082504 | A1 | 4/2008 | Jasik et al. | |
| 2008/0205616 | A1 * | 8/2008 | Teng et al. | 379/202.01 |
| 2009/0006330 | A1 * | 1/2009 | Pandey et al. | 707/3 |
| 2009/0070755 | A1 * | 3/2009 | Taylor et al. | 717/168 |

(Continued)

OTHER PUBLICATIONS

Non-Final Office Action from U.S. Appl. No. 12/584,924, dated Oct. 31, 2011.

(Continued)

*Primary Examiner* — Sujay Koneru
(74) *Attorney, Agent, or Firm* — Zilka-Kotab, PC

(57) ABSTRACT

There are provided mechanisms and methods for leveraging a customer relationship management system (CRM) to send meeting invitations. These mechanisms and methods for leveraging a CRM system to send meeting invitations can enable identification of invitees to which to send the meeting invitation using customer information stored by the CRM system. The ability to leverage the CRM system to identify the invitees can provide a more efficient technique for scheduling meetings.

19 Claims, 11 Drawing Sheets

(56) References Cited

U.S. PATENT DOCUMENTS

| | | | |
|---|---|---|---|
| 2009/0125818 A1* | 5/2009 | Ritter et al. | 715/753 |
| 2009/0171700 A1* | 7/2009 | O'Sullivan et al. | 705/5 |
| 2009/0216601 A1* | 8/2009 | Chethan Anand | 705/9 |
| 2009/0281860 A1* | 11/2009 | Bhogal et al. | 705/8 |
| 2010/0088636 A1 | 4/2010 | Yerkes et al. | |

OTHER PUBLICATIONS

Slovak, Ken, "Absolute Beginner's Guide to Microsoft Office Outlook 2003," Que Publishing, Oct. 1, 2003, pp. 162-204.

U.S. Appl. No. 60/828,192, filed Oct. 4, 2006.

Schonfeld, E; Presdo, The Magical Online Scheduler, TechCrunch, Apr. 25, 2008, retrieved from http://techcrunch.com/2008/04/25/presdo-the-magical-online-scheduler/.

Tungle, Are You Ready to Tungle? New Tungle Meeting Coordinator Enters Open Beta, Business Wire, Apr. 16, 2008, Montreal, retrieved from http://www.businesswire.com/portal/site/google/?ndmViewId=news_view&newsId=20080416005438&newsLang=en.

Gonzalez, N., TimeBridge: Now Synching Your Meetings Through The Web, Aug. 14, 2007, retrieved from http://techcrunch.com/2007/08/14/timebridge-now-synching-your-meetings-through-the-web/.

Harris, J., TimeBridge Makes Meeting Scheduling Easy, Mar. 7, 2007, retrieved from http://gigaom.com/collaboration/timebridge-makes-meeting-scheduling-easy/.

Microsoft Office, Support/Outlook/Outlook 2003 Help and How-to, About Calendar, 2003, retrieved from http://office.microsoft.com/en-au/outlook-help/about-calendar-HP003075919.aspx.

Using Outlook's Calendar Feature, IT, Jul. 17, 2008, retrieved from http://web.archive.org/web/20080717201953/http://www.cod.edu/it/helpdesk/calendar/calendar.htm.

Non-Final Office Action from U.S. Appl. No. 121584,924, dated Aug. 16, 2012.

* cited by examiner

FIGURE 3

SYSTEM, METHOD AND COMPUTER PROGRAM PRODUCT FOR LEVERAGING A CUSTOMER RELATIONSHIP MANAGEMENT SYSTEM TO SEND MEETING INVITATIONS

CLAIM OF PRIORITY

This application claims the benefit of U.S. Provisional Patent Application 61/254,534 entitled "Advanced Scheduling," by Ron Yerkes, filed Oct. 23, 2009, the entire contents of which are incorporated herein by reference.

CROSS REFERENCE TO RELATED APPLICATIONS

The following commonly owned, co-pending United States patent application, including the present application, are related to each other. Each of the other patents/applications are incorporated by reference herein in its entirety:

U.S. patent application Ser. No. 12/584,924 entitled "Method and System for Providing In-Line Scheduling in an On-Demand Service," by Yerkes et al., filed Sep. 14, 2009.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to scheduling meetings, and more particularly to meeting invitations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventionally, applications have been provided for electronically scheduling meetings between people, such as calendaring applications, etc. Unfortunately, these conventional applications have exhibited numerous limitations. For example, scheduling applications have typically not leveraged, and specifically have been separate from, existing customer relationship management systems. Thus, customer information used for scheduling meetings has generally been required to be imported from other systems or manually entered, thereby slowing the process of scheduling meetings.

Another exemplary limitation includes calendaring systems which do not facilitate the negotiation of meeting times (e.g. such that meeting organizers must use other mechanisms, such as phone, email, etc. for negotiating times), but instead require the organizer to propose a single specific time for the meeting. This dramatically increases the amount of time and effort required to set up a meeting, especially when attendees are typically on different calendaring systems and cannot access one another's free/busy information. In addition, since organizers are oftentimes required to use email to arrange times, the cumulative conversation about a meeting is usually lost in the Inbox and not associated with the meeting. This is problematic if an organizer needs to reschedule a meeting and use time preferences expressed by invitees during the original negotiation.

Another exemplary limitation includes calendaring systems which do not give users the ability to share free/busy information between disparate calendaring systems, such that identifying a specific time to propose the meeting, as described above, is either not based on known availability of the invitees or requires extraneous communications with the invitees to discover their availability. Yet another exemplary limitation includes calendaring systems which do not allow organizers to brand and personalize the invitation experience. Accordingly, a more efficient technique for scheduling meetings having increased functionality over the traditional scheduling applications is desirable.

BRIEF SUMMARY

In accordance with embodiments, there are provided mechanisms and methods for leveraging a customer relationship management system (CRM) to send meeting invitations. These mechanisms and methods for leveraging a CRM system to send meeting invitations can enable identification of invitees to which to send the meeting invitation using customer information stored by the CRM system. The ability of embodiments to leverage the CRM system to identify the invitees can provide a more efficient technique for scheduling meetings.

In an embodiment and by way of example, a method for leveraging a CRM system to send meeting invitations is provided. In use, a request to schedule a meeting is received from a requestor via an interface of a CRM system. Additionally, at least one invitee to the meeting is identified utilizing the CRM system. Further, an invitation to the meeting is sent to the at least one invitee.

While one or more implementations and techniques are described with reference to an embodiment in which leveraging a CRM system to send meeting invitations is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 3 illustrates a graphical user interface (GUI) for allowing a requestor of a meeting to leverage customer information within a CRM system to identify an invitee to which to send an invitation to a meeting, in accordance with another embodiment;

DETAILED DESCRIPTION

General Overview

Systems and methods are provided for leveraging a customer relationship management (CRM) system to send meeting invitations.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing leveraging a CRM system to send meeting invitations will be described with reference to example embodiments.

Figure 1:
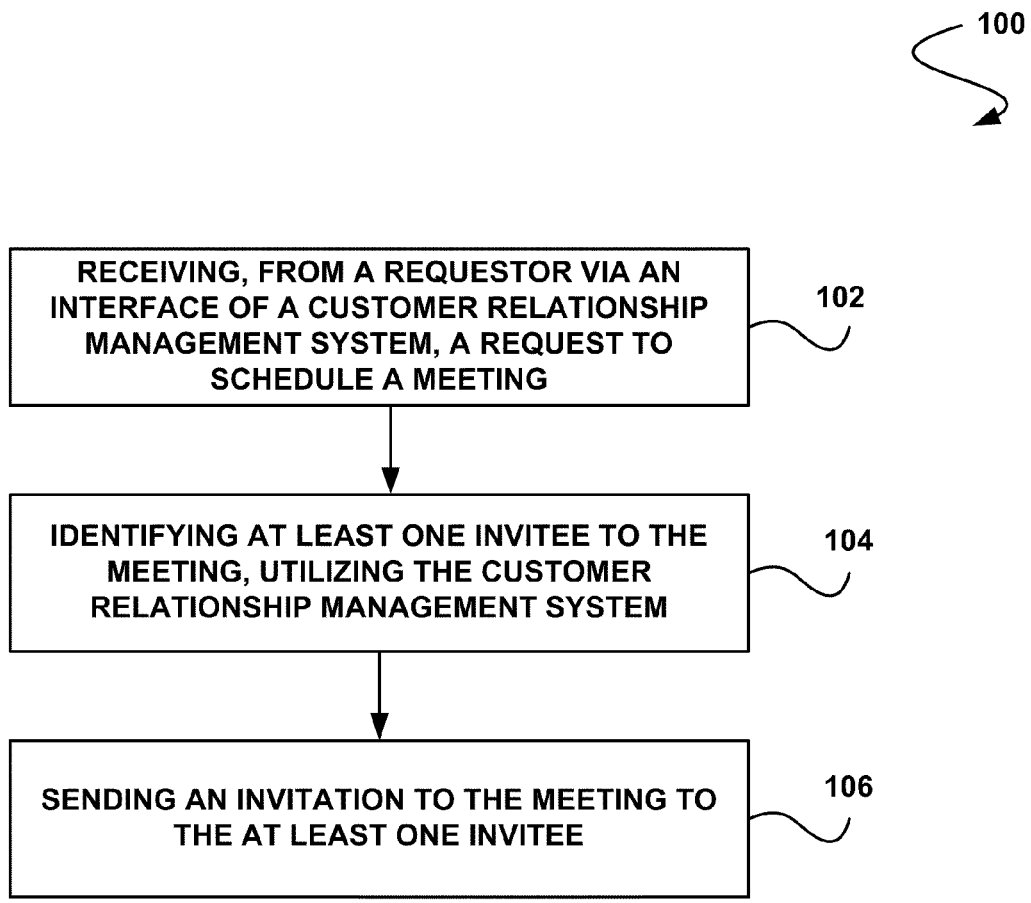
FIG. 1 illustrates a method for leveraging a customer relationship management (CRM) system to send meeting invitations, in accordance with one embodiment.

FIG. 1 illustrates a method 100 for leveraging a customer relationship management (CRM) system to send meeting invitations, in accordance with one embodiment. As shown in operation 102, a request to schedule a meeting is received from a requestor via an interface of a CRM system. With respect to the present description, the meeting includes any scheduled event during which at least two parties communicate. For example, the meeting may include a teleconference, an in-person meeting, or any other session during which communications between parties occurs. To this end, scheduling the meeting may include determining a time, place, etc. for the meeting which is agreeable to the parties to the meeting.

Optionally, the requestor from which the request to schedule the meeting is received may include one of the aforementioned parties. Of course, as another option, the requestor may not necessarily be a party to the meeting. For example, the requestor may request the meeting for (e.g. on behalf of) other parties to the meeting.

Also, with respect to the present description, the CRM system includes any system (e.g. applications, service, etc.) which manages relationships with customers. It should be noted that such customers may be customers of any provider (e.g. service provider, product provider, etc.). For example, the customers may be customers of the requestor, and the requestor may utilize the CRM application for managing its relationships with its customers.

In various embodiments, the CRM system may store profile information for the customers (e.g. contact information, customer transactions, demographic information, etc.), and may further be utilized to convert leads into customers, view account-related information and activities, respond to customer calls or emails, capture information about customer interactions, manage tasks and follow-up activities, etc. In one embodiment, the CRM system may include a synchronization component that synchronizes an invitee's CRM system calendar with another calendar (e.g. Microsoft Outlook, Mozilla Thunderbird, Apple iCal, etc.). One such synchronization component is described in co-pending U.S. Patent Application No. 61/320,184 entitled "Sync API," by Markham et al., filed Apr. 1, 2010. Just by way of example, the CRM system may integrated within a multi-tenant on-demand database system, such as that described below with respect to FIGS. 9 and 10, such that the requestor and/or other parties to the meeting may include tenants of the multi-tenant on-demand database system.

As noted above, the request to schedule the meeting is received via an interface of the CRM system. In one embodiment, the interface may include a graphical user interface (GUI) with a selectable option to schedule a meeting, such that the request may be received in response to selection of the option. In another embodiment, the interface may include a GUI with fields for receiving configurable parameters to be used in scheduling the meeting (e.g. a time for the meeting, etc.), such that the request may be received based on the receipt of the configurable parameters.

Additionally, as shown in operation 104, at least one invitee to the meeting is identified utilizing the CRM system. With respect to the present description, the invitee includes any of the aforementioned parties to the meeting which is separate from the requestor. In particular, the invitee includes a party desired by the requestor to be invited to the meeting.

It should be noted that the invitee may be identified utilizing the CRM system in any manner. As described above, the CRM system may store information associated with customers. Thus, in the present embodiment, the invitee may be a customer, such that the invitee may be identified from customer information stored by the CRM system (e.g. a list of customers maintained by the CRM system).

In one embodiment, the invitee may be identified in response to selection by the requestor of the invitee (e.g. an identifier of the invitee) from a plurality of invitees for which information is maintained by the CRM system. Accordingly, the CRM may include a GUI for allowing the requestor to select which invitees are to be invited to the meeting. In another embodiment, the request to schedule the meeting may be received from a GUI displaying details associated with (e.g. a profile of) the invitee, such that the invitee may be automatically identified as a result of its profile being the source of the request to schedule the meeting.

Moreover, identifying the invitee may include identifying, via the CRM system, any information associated with the invitee. For example, an email address of the invitee or any other contact information associated with the invitee may be identified, the reasons for which are set forth in more detail below.

Further, as shown in operation 106, an invitation to the meeting is sent to the at least one invitee. In the present embodiment, the invitation may include any notification requesting participation of the invitee in the meeting. Thus, the invitation may include various information associated with the meeting.

In one embodiment, the information may be included (e.g. by the requestor) in the request to schedule the meeting. Of course, such information may be received separate from the request, in another embodiment. Still yet, the invitation may be configured utilizing the information. Optionally, the information may include a logo, proposed times for the meeting, a location of the meeting, a list of parties to the meeting, etc.

It should be noted that, in one embodiment, the invitation may be sent by the CRM system. In yet another embodiment, the invitation may be sent utilizing the above described information associated with the invitee (e.g. the email address, etc.). In a further embodiment, the invitation may be sent to a scheduling application (e.g. a calendar application, etc.) utilized by the invitee for managing appointments, meetings, etc. Optionally, the scheduling application may be provided as a component of the CRM system, or may be an application separate from the CRM system.

To this end, a CRM system may be utilized at least to identify an invitee to a meeting in response to a received request to schedule a meeting. In this way, customer information maintained by the CRM system may be leveraged to identify the invitee. Such existing customer information may be utilized such that manual entry of the invitee by the requestor of the meeting or importation of the invitee from a remote system may be avoided.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
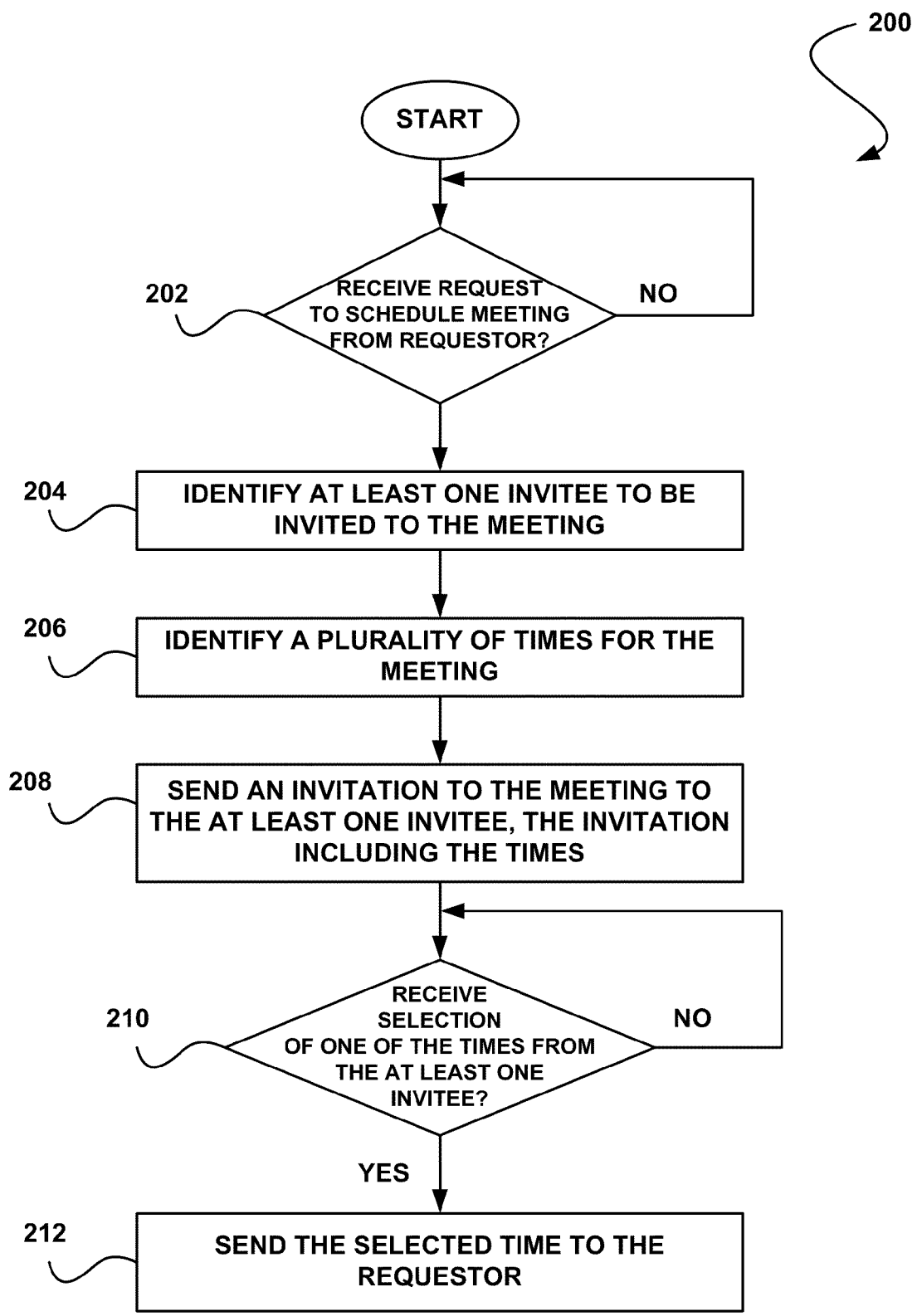
FIG. 2 illustrates a method of a CRM system for scheduling a meeting, in accordance with another embodiment.

FIG. 2 illustrates a method 200 of a CRM system for scheduling a meeting, in accordance with another embodiment. As an option, the method 200 may be carried out in the context of the architecture and environment of FIG. 1. For example, the method 200 may be carried out utilizing the CRM system described above with respect to FIG. 1. Of course, however, the method 200 may be carried out in any desired environment.

As shown in decision 202, it is determined whether a request to schedule a meeting is received from a requestor. With respect to the present embodiment, the request may be received via an interface of a CRM system. For example, a GUI of the CRM system may include an option for scheduling a meeting that is selectable by the requestor.

If it is determined that the request to schedule the meeting has not been received, the method 200 continues to wait for such a request to be received. Once it is determined that the request has been received, at least one invitee to be invited to the meeting is identified. Note operation 204. In the present embodiment, the invitee is identified utilizing the CRM system. For example, the invitee may be selected from a list of invitees, or may be automatically identified in response to the scheduling of the meeting being requested from within a profile of the invitee provided by the CRM system.

In addition, a plurality of times for the meeting may be identified. Note operation 206. In one embodiment, the times may be identified from proposed times entered by the requestor (e.g. via a GUI of the CRM system, with the request, etc.). The proposed times may include specific days and/or times during at least one specific day for the meeting.

Optionally, such proposed times may be manually determined by the requestor based on free and busy information associated with the requestor, the invitee, and/or a location of the meeting. Such free and busy information may be provided to the requestor from a calendar application (e.g. of the CRM application or separate from the CRM application) for use in determining the proposed times. The free information may include times during which other meetings/appointments are not scheduled, whereas the busy information may include times during which other meetings/appointments are scheduled.

In another embodiment, the times may be identified automatically by the CRM system. For example, the times may be automatically identified based on parameters input by the requestor. Such parameters may include a duration of the meeting, a time period during which the meeting is to be held, a location of the meeting, etc. As another example, the times may be automatically identified utilizing free and busy information associated with the invitee, requestor, and/or location of the meeting (such as the free and busy information described above). In one exemplary embodiment, the times may include times meeting the parameters and/or during which no other meetings/appointments are scheduled (e.g. as determined from the free and busy information).

Further, an invitation to the meeting is sent to the invitee, where the invitation includes an indication of each of the times. Note operation 208. The invitation may be sent to a calendar application utilized by the invitee, via email, etc. Optionally, the invitation may be sent based on information associated with the invitee (e.g. the email address of the invitee, an identifier of the invitee associated with a calendar application utilized by the invitee, etc.), as determined in conjunction with identification of the invitee.

In one embodiment, the invitation may include a GUI for notifying the invitee of the request that the invitee attend the meeting. Moreover, such GUI may be interactive. For example, in the context of the present embodiment, the indication of each of the times in the invitation may be selectable by the invitee for notifying the requestor of one of the times preferred by the at least one invitee.

Thus, the invitee may select on the invitation one of the times indicated in the invitation at which the invitee prefers the meeting to be held. To this end, it is determined whether a selection of one of the times is received from the invitee. Note decision 210. For example, it may be determined whether the invitee has selected one of the times on the invitation. Optionally, the invitee may select one of the times and further select an option on the invitation to submit the selected time to the requestor, such that the selected time may be received in response to the selection of option.

If it is determined that a selection of one of the times has not been received from the invitee, the method 200 continues to wait for receipt of such a selection. However, once it is determined that a selection of one of the times has not been received from the invitee, the selected time is sent to the requestor. Note operation 212. In one embodiment, the selection may be sent to the requestor via the application utilized by the requestor to submit the request to schedule the meeting (in operation 202).

Moreover, the requestor may utilize the received selection for confirming to the invitee one of the times for the meeting. For example, for each invitee to which the invitation with the times is sent, the requestor may receive a selected time from such invitee. Further, upon receipt of a selected time from all of the invitees to which the invitation was sent, the requestor may determine at which of the times included in the invitation the meeting is to be held and may further confirm the same to the invitees. Just by way of example, the time determined by the requestor may include a time commonly selected by all of the invitees, a time commonly selected by a majority of the invitees, etc. In addition, the requestor may confirm the determined time to the invitees by sending the invitees a notification of the confirmed time (e.g. which the invitees may download to their respective calendar applications, etc.).

In addition to the operations described above, the CRM system may provide additional functionality. In one embodiment, support for rescheduling meetings may be provided, such that at any time the requestor can re-enter the method 200 described above to facilitate the identification of a new time for a previously scheduled meeting. In another embodiment, natural language parsing may be utilized for allowing invitees to propose other times for the meeting not included in the proposed times provided by the requestor or automatically by the system. The other proposed times may be translated into structured data that can be used by the requestor.

In another embodiment, invitees may sign-up for a scheduling application in order to share free/busy information with other customers which may or may not be a part of the same organization. This may enable a network of users that can plan, execute, and follow-up on events across companies. In yet another embodiment, the method 200 described above may be employed on a mobile device, such that both requestors and invitees may be able to interact using their mobile devices to schedule meetings. In still yet another embodiment, phasing of meeting time confirmation may be provided, such that a requestor may receive confirmation (e.g. via multiple confirmation steps) from at least a subset of invitees of their availability prior to proposing times for a meeting to those invitees. For example, in the selling scenario, a request may want to get confirmation from the requester's sales team initially before proposing times to customers.

Figure 3:
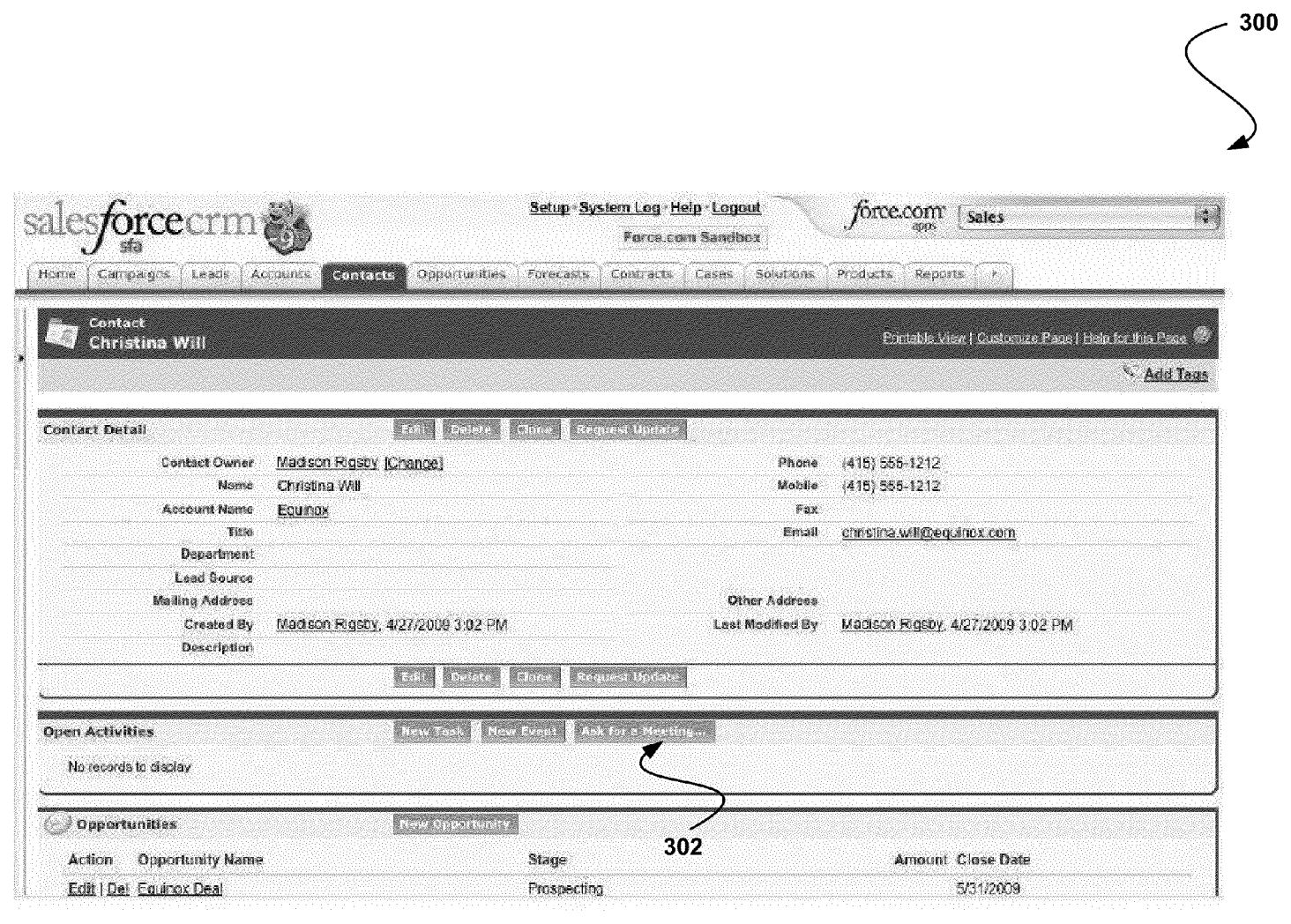

FIG. 3 illustrates a GUI 300 for allowing a requestor of a meeting to leverage customer information within a CRM system to identify an invitee to which to send an invitation to a meeting, in accordance with another embodiment. As an option, the GUI 300 may be implemented in the context of the architecture and environment of FIGS. 1-2. For example, the GUI 300 may be provided by the CRM system described above with respect to FIG. 1. Of course, however, the GUI 300 may be implemented in any desired environment.

As shown, the GUI 300 may present information associated with a particular customer (e.g. which is maintained by a CRM system). The GUI 300 may be displayed upon selection of the customer from a list of customers, in one embodiment. The GUI 300 may further include an option 302 to request that a meeting be scheduled with the customer (hereinafter the invitee).

Upon selection of the option 302, another GUI may be displayed for use in identifying times at which the meeting is proposed to be scheduled. Examples of such other GUI are described below with respect to FIGS. 4A-B.

Figure 4A:
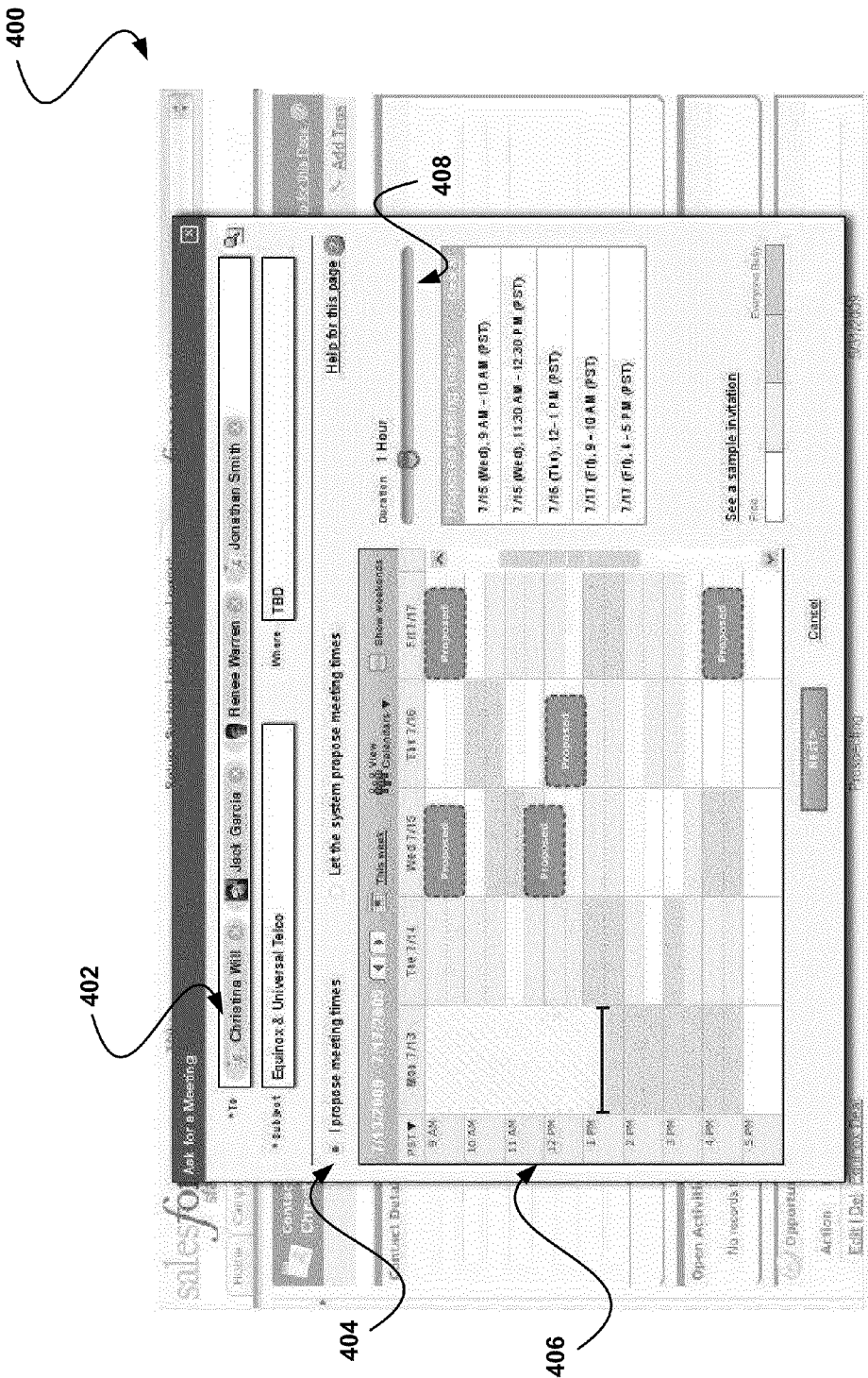
FIG. 4A illustrates a GUI for allowing a requestor of the meeting to propose multiple times for the meeting to be included in the invitation to the meeting, in accordance with another embodiment.

FIG. 4A illustrates a GUI 400 for allowing a requestor of the meeting to propose multiple times for the meeting to be included in the invitation to the meeting, in accordance with another embodiment. As an option, the GUI 400 may be implemented in the context of the architecture and environment of FIGS. 1-3. For example, the GUI 400 may be provided by the CRM system described above with respect to FIG. 1. Of course, however, the GUI 400 may be implemented in any desired environment.

As shown, the GUI 400 includes a list of invitees 402 to which an invitation to a meeting including proposed times for the meeting is to be sent. The GUI 400 also includes an option 404 for the requestor to manually enter the proposed times. Thus, selection of the option 404 may result in a calendar 406 being displayed for use by the requestor in entering the proposed times.

In the present embodiment shown, the requestor may use the calendar 406 to enter the proposed times by selecting days, times, etc. on the calendar. The requestor may also optionally specify a duration 408 of the meeting utilizing a single entry (e.g. via a single tool). Thus, the proposed times may automatically be configured to be of the duration 408 specified by the requestor.

Figure 4B:
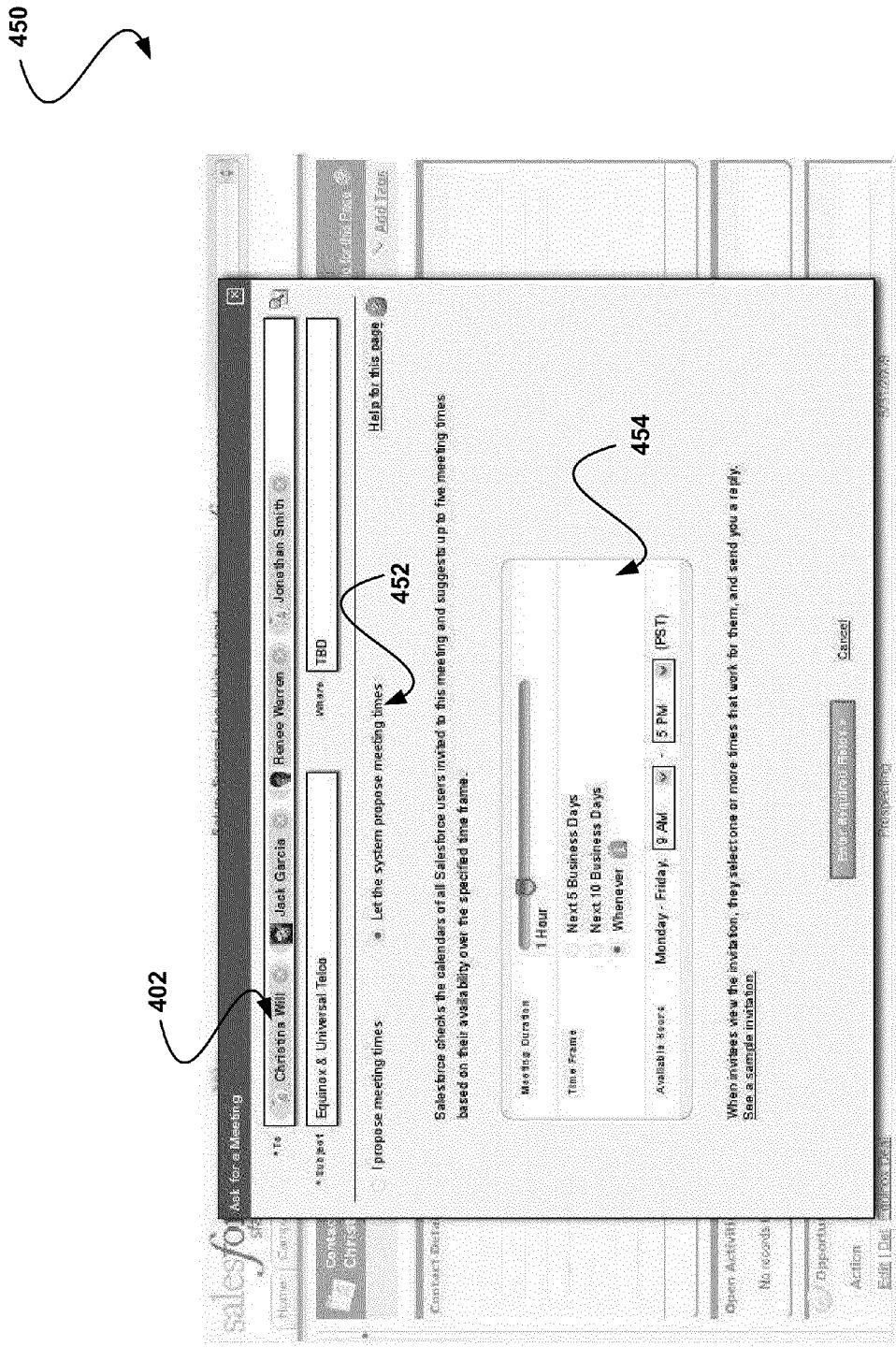
FIG. 4B illustrates a GUI for allowing a requestor of the meeting to request the CRM system to automatically propose multiple times for the meeting to be included in the invitation to the meeting, in accordance with another embodiment.

FIG. 4B illustrates a GUI 450 for allowing a requestor of the meeting to request the CRM system to automatically propose multiple times for the meeting to be included in the invitation to the meeting, in accordance with another embodiment. As an option, the GUI 450 may be implemented in the context of the architecture and environment of FIGS. 1-3. For example, the GUI 450 may be provided by the CRM system described above with respect to FIG. 1. Of course, however, the GUI 450 may be implemented in any desired environment.

As shown, the GUI 450 includes a list of invitees 402 to which an invitation to a meeting including proposed times for the meeting is to be sent. The GUI 450 includes an option 452 for the proposed times to be automatically identified based on parameters configured by the requestor. As shown, selection of the option 452 may result in a display of configurable parameters 454 for configuration by the requestor. In various embodiments, the configurable parameters 454 may include a duration of the meeting, a time period during which the proposed times are allowed to be identified, an availability of the requestor, etc.

Figure 5:
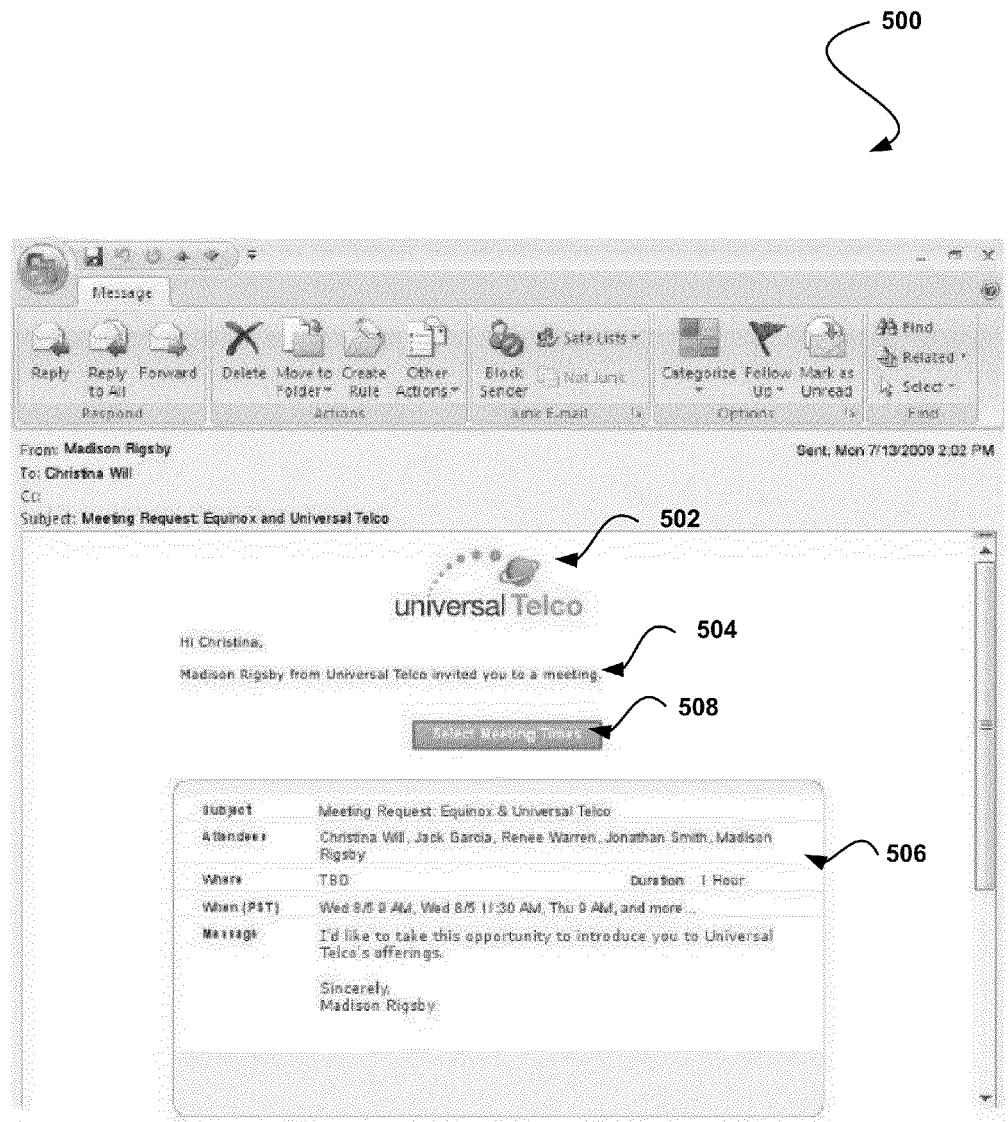
FIG. 5 illustrates a GUI presenting a branded invitation to a meeting, in accordance with another embodiment.

FIG. 5 illustrates a GUI 500 presenting a branded invitation to a meeting, in accordance with another embodiment. As an option, the GUI 500 may be implemented in the context of the architecture and environment of FIGS. 1-4B. For example, the GUI 500 may be provided by the CRM system described above with respect to FIG. 1. Of course, however, the GUI 500 may be implemented in any desired environment.

The GUI 500 presents an invitation to a meeting which is branded with a logo 502 selected by the requestor of the meeting (e.g. during customization of the invitation by the requestor). Of course, the invitation may also be customized in ways additional to or instead of the logo 502, such as photos, text, etc. The invitation includes a comment 504 configured automatically by the system or manually by the requestor, in addition to information 506 associated with the meeting. The information 506 associated with the meeting may include a subject of the meeting, all invitees to which the invitation has been sent, a location of the meeting, proposed times for the meeting, and a note configured by the requestor.

Figure 6:
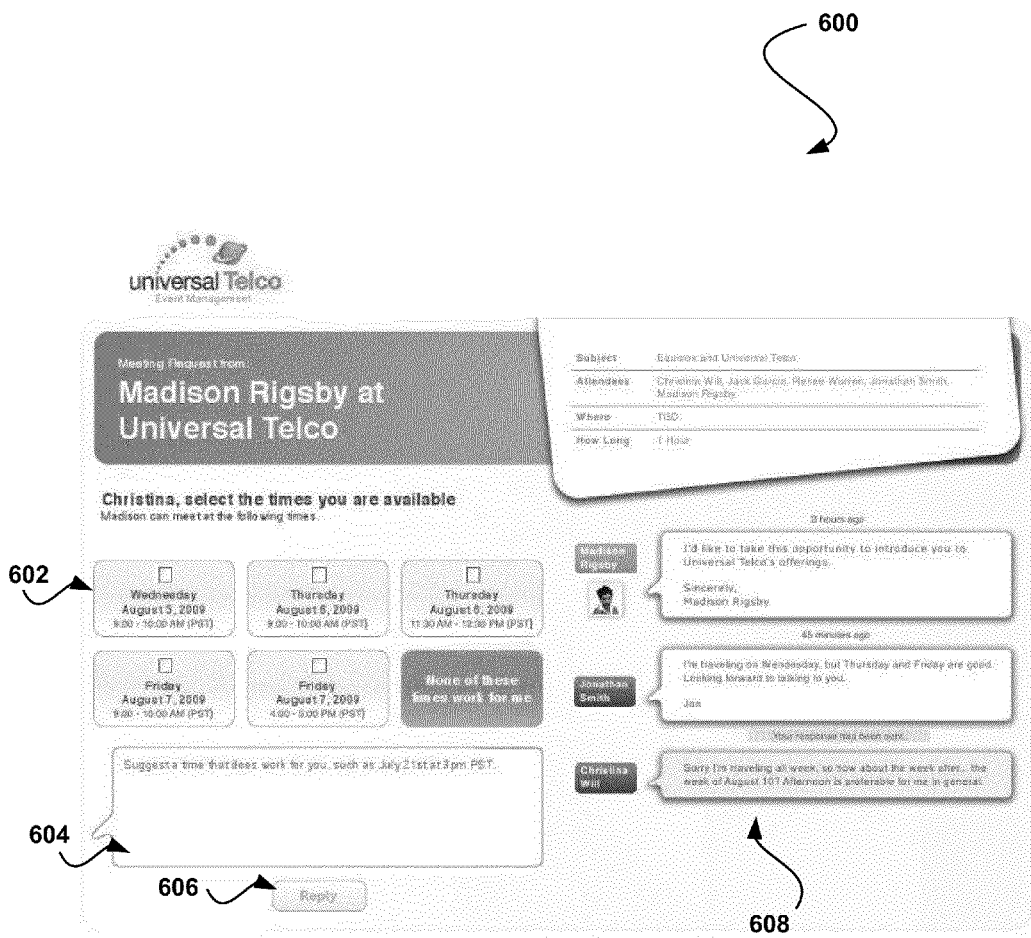
FIG. 6 illustrates a GUI presenting an invitation to a meeting which includes proposed times for the meeting that are selectable by the invitee, in accordance with another embodiment.

In the present embodiment, an invitee receives the invitation for selecting one of the proposed times preferred by the invitee. Accordingly, as shown, the invitation includes a selectable option 508 for use in allowing the invitee to select one of the proposed times. Upon selection of the option 508, another GUI may be displayed which allows the invitee to select one of the proposed times. FIG. 6 shows an example of such other GUI.

FIG. 6 illustrates a GUI 600 presenting an invitation to a meeting which includes proposed times for the meeting that are selectable by the invitee, in accordance with another embodiment. As an option, the GUI 600 may be implemented in the context of the architecture and environment of FIGS. 1-5. For example, the GUI 600 may be provided by the CRM system described above with respect to FIG. 1. Of course, however, the GUI 600 may be implemented in any desired environment.

The GUI 600 displays all proposed times 602 for a meeting which has been requested to be scheduled. Each proposed time is separately selectable, as shown. In this way, an invitee viewing the GUI 600 may select one of the proposed times at which the invitee prefers the meeting to be held, and may submit the selected time to the requestor.

Additionally, the GUI 600 includes a comment field 604 for allowing the requestor of the meeting to enter a comment during configuration of the invitation (for display to the invitee receiving the invitation). The GUI 600 also includes an option 606 for allowing the invitee to enter a comment. All comments entered by invitees of the meeting are displayed on the GUI 600 in a list of comments 606, such that each invitee and the requestor may view the comments of other invitees.

Figure 7:
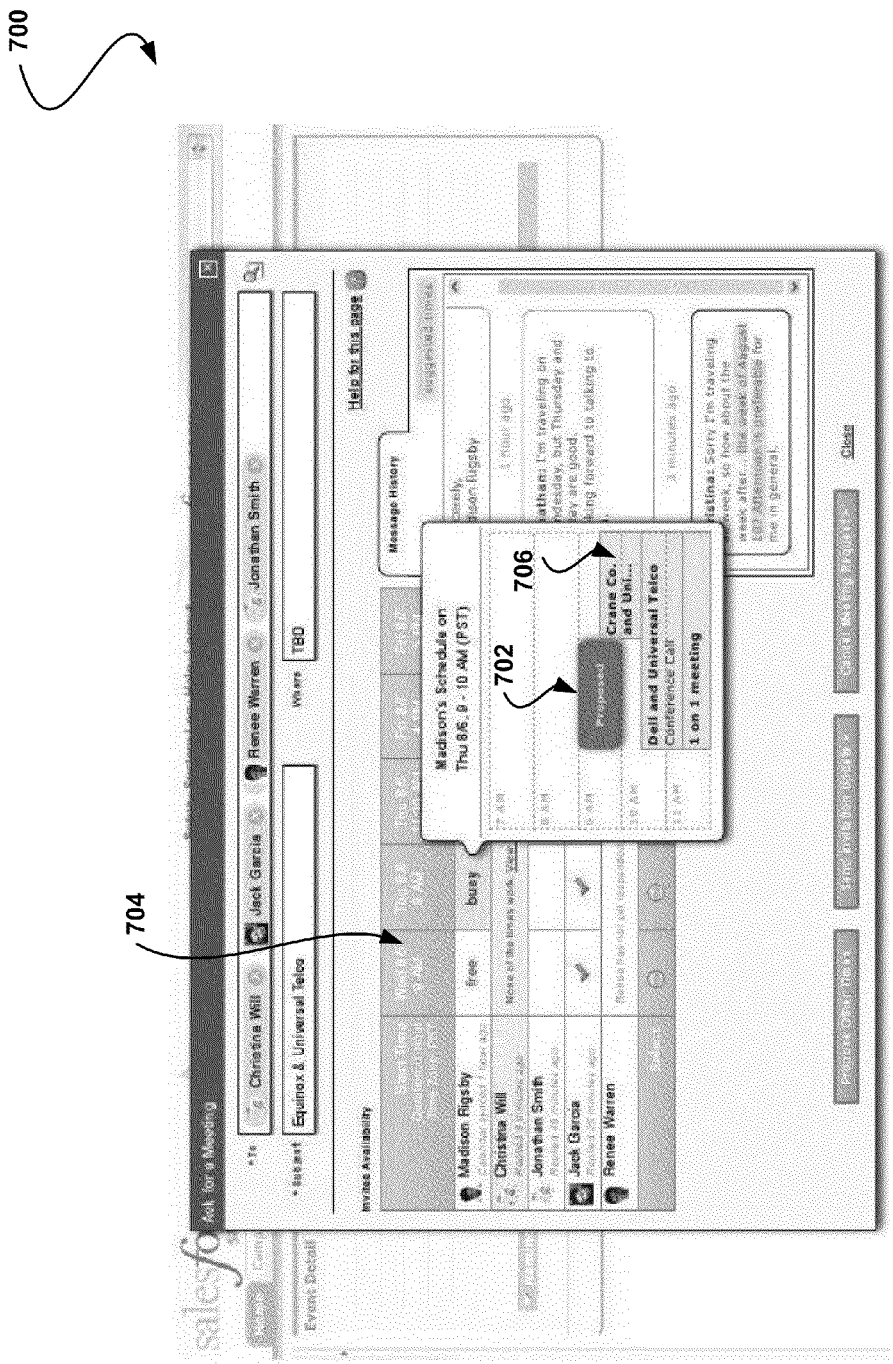
FIG. 7 illustrates a GUI presenting meeting times selected by invitees, in accordance with another embodiment.

FIG. 7 illustrates a GUI 700 presenting meeting times selected by invitees, in accordance with another embodiment. As an option, the GUI 700 may be implemented in the context of the architecture and environment of FIGS. 1-6. For example, the GUI 700 may be provided by the CRM system described above with respect to FIG. 1. Of course, however, the GUI 700 may be implemented in any desired environment.

After the invitees have submitted a selected one of the proposed times, the GUI 700 may be viewed by the requestor to review the times selected by the invitees. As shown, the GUI 700 may display for each invitee the time 702 selected by such invitee. The GUI 700 may also generally display an indication 704 of whether the invitee is free or busy during specific times, along with specific meetings/appointments 706 on the invitees calendar (e.g. upon which the general indication 704 is based).

To this end, the requestor may view the times selected by the invitees to determine one of the proposed times at which the meeting is to be held. For example, the requestor may choose the one of the proposed times that has been selected by a majority of the invitees or during which all of the invitees are free. Upon determination of one of the proposed times by the requestor, such determined time may be confirmed to each of the invitees by notifying the invitees of the determined time.

Figure 8:
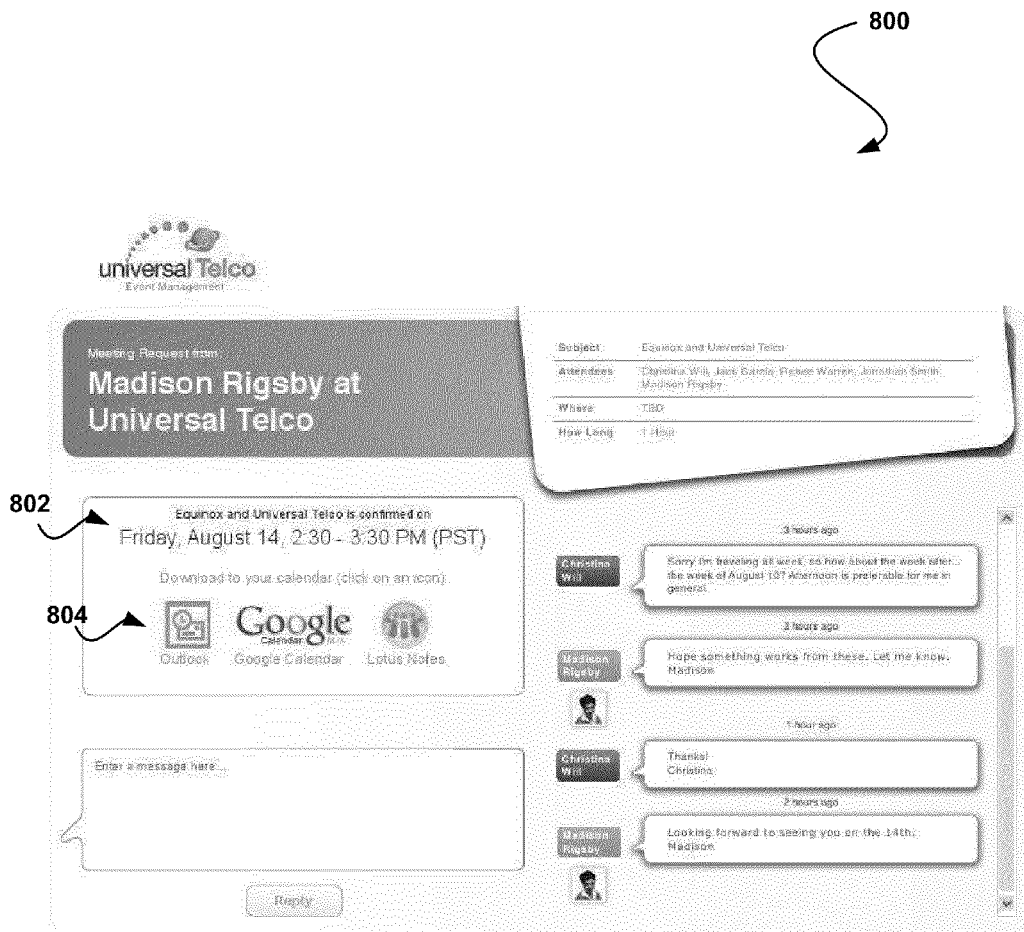
FIG. 8 illustrates a GUI presenting information for a scheduled meeting which may be downloaded into an invitee's calendar system, in accordance with yet another embodiment.

FIG. 8 illustrates a GUI 800 presenting information for a scheduled meeting which may be downloaded into an invitee's calendar system, in accordance with yet another embodiment. As an option, the GUI 800 may be implemented in the context of the architecture and environment of FIGS. 1-7. For example, the GUI 800 may be provided by the CRM system described above with respect to FIG. 1. Of course, however, the GUI 800 may be implemented in any desired environment.

The GUI 800 shows receipt of a notification confirming a time at which a meeting has been scheduled. The GUI 800 displays information 802 associated with meeting, such as the confirmed meeting time, the location of the meeting, etc. Additionally, the GUI 800 includes an option 804 for allowing an invitee viewing the notification to download the information 802 into the invitee's calendar application, such that the calendar application may store the information 802 for subsequent viewing by the invitee.

System Overview

Figure 9:
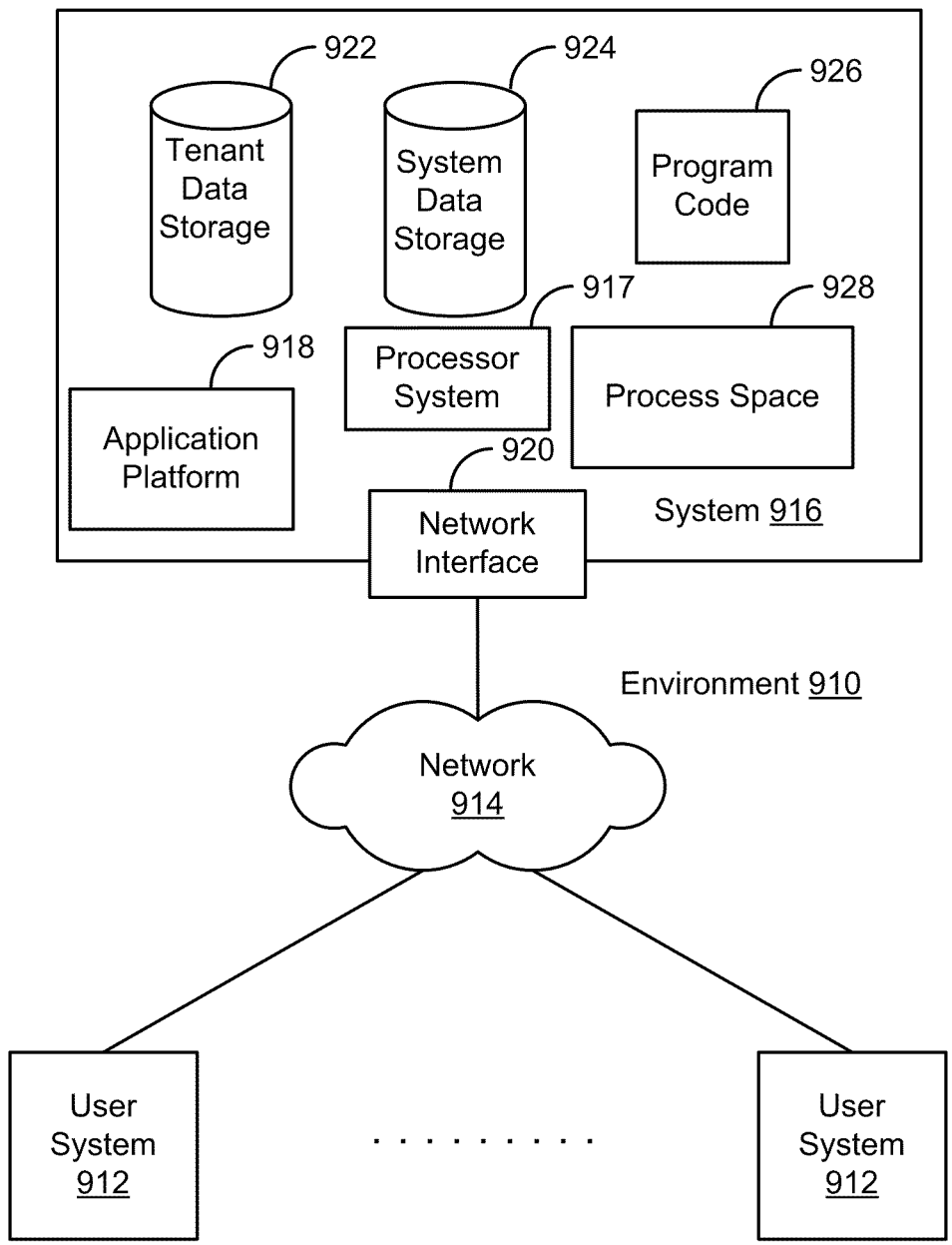
FIG. 9 illustrates a block diagram of an example of an environment wherein an on-demand database service might be used.

FIG. 9 illustrates a block diagram of an environment 910 wherein an on-demand database service might be used. Environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
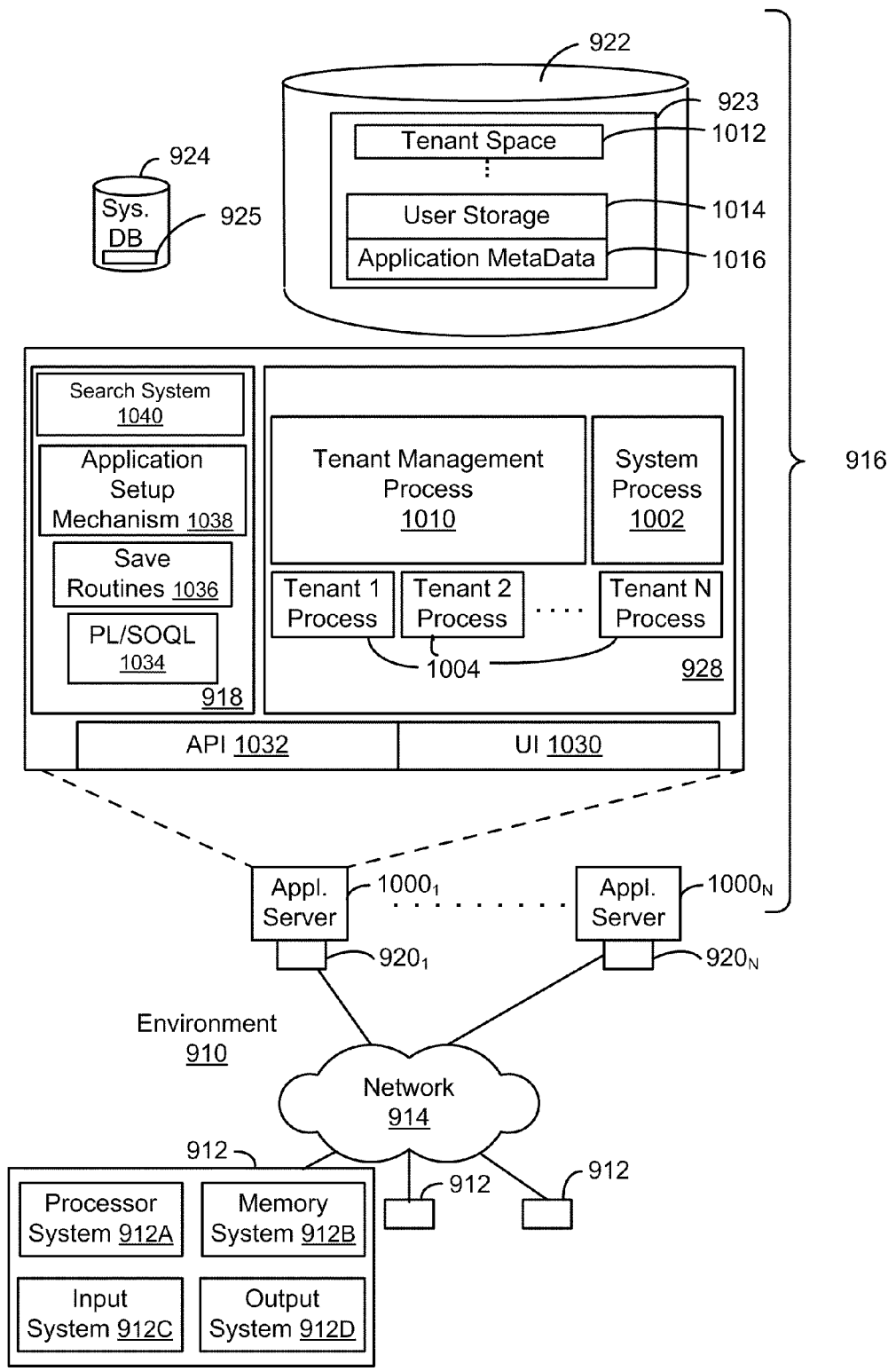
FIG. 10 illustrates a block diagram of an embodiment of elements of FIG. 9 and various possible interconnections between these elements.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$1000_N$, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1016 for the subscriber making the invocation and executing the metadata as an application in a virtual machine.

Each application server 1000 may be communicably coupled to database systems, e.g., having access to system data 925 and tenant data 923, via a different network connection.

For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a tangible computer readable medium, comprising:
   computer code for storing in a customer relationship management system profiles for a plurality of customers, the profiles including contact information, customer transactions, and demographic information;
   computer code for displaying a first graphical user interface of the customer relationship management system;
   computer code for receiving, from a requestor via the first graphical user interface of the customer relationship management system, a request to schedule a meeting;
   computer code for generating an invitation to the meeting in response to the request, utilizing at least one second graphical user interface of the customer relationship management system, by:
      identifying, from the profiles stored for the plurality of customers by the customer relationship management system, at least one invitee to the meeting such that manual entry of the at least one invitee by the requestor of the meeting and importation of the at least one invitee from a remote system is avoided,
      identifying a plurality of times for the meeting,
      generating the invitation to the meeting for the at least one invitee and including an indication of each of the times in the invitation; and
   computer code for sending by the customer relationship management system the invitation to the meeting to the at least one invitee, wherein the indication of each of the times is selectable by the at least one invitee for notifying the requestor of one of the times preferred by the at least one invitee.
   wherein the profiles stored for the plurality of customers by the customer relationship management system is utilized to identify the at least one invitee to the meeting such that manual entry of the at least one invitee by the requestor of the meeting and importation of the at least one invitee from a remote system is avoided.

2. The computer program product of claim 1, wherein the customer relationship management system includes an application utilized by the requestor for managing relationships with the customers that are of the requestor.

3. The computer program product of claim 1, wherein the computer program product is operable such that the at least one invitee is identified in response to selection by the requestor of the at least one invitee from the profiles stored for the plurality of customers by the customer relationship management system.

4. The computer program product of claim 1, wherein the computer program product is operable such that identifying the at least one invitee includes identifying an email address of the at least one invitee.

5. The computer program product of claim 1, wherein the computer program product is operable such that the request is received from the second graphical user interface displaying details associated with the at least one invitee.

6. The computer program product of claim 1, wherein the computer program product is operable such that the invitation is configured utilizing information included in the request to schedule the meeting.

7. The computer program product of claim 6, wherein the information includes a logo.

8. The computer program product of claim 1, wherein the computer program product is operable such that the times are identified from proposed times entered by the requestor.

9. The computer program product of claim 1, wherein the computer program product is operable such that the times are identified automatically by the customer relationship management system.

10. The computer program product of claim 9, wherein the computer program product is operable such that the times are automatically identified based on parameters input by the requestor.

11. The computer program product of claim 10, wherein the parameters include a duration of the meeting and a time period during which the meeting is to be held.

12. The computer program product of claim 1, wherein the computer program product is operable such that the times are identified utilizing free and busy information associated with the at least one invitee.

13. The computer program product of claim 1, further comprising computer code for receiving a selection of one of the times from the at least one invitee.

14. The computer program product of claim 13, further comprising computer code for sending the selection to the requestor for use in confirming to the at least one invitee one of the times for the meeting.

15. The computer program product of claim 14, wherein for each of the at least one invitee to which the invitation indicating the times is sent, the requestor receives a selected one of the times from the invitee, such that upon receipt of the selected one of the times from each of the at least one invitee, the requestor determines at which of the selected one of the times the meeting is to be held for confirming to the at least one invitee the determined one of the selected times for the meeting.

16. The computer program product of claim 1, wherein each of the identified times includes a start time and an end time, such that the times identified for the meeting and indicated in the invitation each include a different period of time proposed for holding the meeting.

17. A method, comprising:
storing in a customer relationship management system profiles for a plurality of customers, the profiles including contact information, customer transactions, and demographic information;
displaying a first graphical user interface of the customer relationship management system;
receiving, from a requestor via the first graphical user interface of the customer relationship management system, a request to schedule a meeting;
generating an invitation to the meeting in response to the request, utilizing at least one second graphical user interface of the customer relationship management system, by:
identifying, from the profiles stored for the plurality of customers by the customer relationship management system, at least one invitee to the meeting such that manual entry of the at least one invitee by the requestor of the meeting and importation of the at least one invitee from a remote system is avoided, identifying a plurality of times for the meeting,
generating the invitation to the meeting for the at least one invitee and including an indication of each of the times in the invitation; and
sending by the customer relationship management system the invitation to the meeting to the at least one invitee, wherein the indication of each of the times is selectable by the at least one invitee for notifying the requestor of one of the times preferred by the at least one invitee.

18. An apparatus, comprising:
a processor for:
storing in a customer relationship management system profiles for a plurality of customers, the profiles including contact information, customer transactions, and demographic information;
displaying a first graphical user interface of the customer relationship management system;
receiving, from a requestor via the first graphical user interface of the customer relationship management system, a request to schedule a meeting;
generating an invitation to the meeting in response to the request, utilizing at least one second graphical user interface of the customer relationship management system, by:
identifying, from the profiles stored for the plurality of customers by the customer relationship management system, at least one invitee to the meeting such that manual entry of the at least one invitee by the requestor of the meeting and importation of the at least one invitee from a remote system is avoided,
identifying a plurality of times for the meeting,
generating the invitation to the meeting for the at least one invitee and including an indication of each of the times in the invitation; and
sending by the customer relationship management system the invitation to the meeting to the at least one invitee, wherein the indication of each of the times is selectable by the at least one invitee for notifying the requestor of one of the times preferred by the at least one invitee.

19. A method for transmitting code, comprising:
transmitting code to store in a customer relationship management system profiles for a plurality of customers, the profiles including contact information, customer transactions, and demographic information;

transmitting code to display a first graphical user interface of the customer relationship management system;

transmitting code to receive, from a requestor via the first graphical user interface of the customer relationship management system, a request to schedule a meeting;

transmitting code to generate an invitation to the meeting in response to the request, utilizing at least one second graphical user interface of the customer relationship management system, by:

transmitting code to identify, from the profiles stored for the plurality of customers by the customer relationship management system, at least one invitee to the meeting such that manual entry of the at least one invitee by the requestor of the meeting and importation of the at least one invitee from a remote system is avoided, transmitting code to identify a plurality of times for the meeting, transmitting code to generate the invitation to the meeting for the at least one invitee and including an indication of each of the times in the invitation; and transmitting code to send by the customer relationship management system the invitation to the meeting to the at least one invitee, wherein the indication of each of the times is selectable by the at least one invitee for notifying the requestor of one of the times preferred by the at least one invitee.

* * * * *